United States Patent
Schmitt et al.

(10) Patent No.: US 10,353,591 B2
(45) Date of Patent: Jul. 16, 2019

(54) FUSED SHADER PROGRAMS

(71) Applicant: Advanced Micro Devices, Inc., Sunnyvale, CA (US)

(72) Inventors: Michael L. Schmitt, Sunnyvale, CA (US); Radhakrishna Giduthuri, Sunnyvale, CA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 30 days.

(21) Appl. No.: 15/442,499

(22) Filed: Feb. 24, 2017

(65) Prior Publication Data

US 2018/0246655 A1 Aug. 30, 2018

(51) Int. Cl.
 *G06F 3/06* (2006.01)
 *G06T 1/20* (2006.01)

(52) U.S. Cl.
 CPC .......... *G06F 3/0611* (2013.01); *G06F 3/0604* (2013.01); *G06F 3/0634* (2013.01); *G06F 3/0673* (2013.01); *G06T 1/20* (2013.01)

(58) Field of Classification Search
 CPC ....... G06T 15/506; G06T 15/50; G06T 15/60; G06T 15/80; G06T 15/06
 See application file for complete search history.

(56) References Cited

U.S. PATENT DOCUMENTS

| | | | | |
|---|---|---|---|---|
| 7,463,259 B1 * | 12/2008 | Kolb | ...................... | G06T 15/005 345/426 |
| 7,750,913 B1 * | 7/2010 | Parenteau | ............. | G06T 15/005 345/426 |
| 2009/0189909 A1 * | 7/2009 | Jiao | ........................... | G06T 1/60 345/506 |
| 2011/0063313 A1 * | 3/2011 | Bolz | ..................... | G06T 15/005 345/531 |
| 2014/0362102 A1 * | 12/2014 | Cerny | ....................... | G06T 1/20 345/589 |
| 2015/0187129 A1 * | 7/2015 | Sloan | ...................... | G06T 15/60 345/426 |
| 2017/0148204 A1 * | 5/2017 | Hakura | ................. | G06T 15/005 |

OTHER PUBLICATIONS

Ragan-Kelley, J. et al., "Halide: a language for image processing and computational photography", Accessed at: http://halide-lang.org/ on Feb. 24, 2017.

(Continued)

*Primary Examiner* — Todd Buttram
(74) *Attorney, Agent, or Firm* — Volpe and Koenig, P.C.

(57) ABSTRACT

Improvements in compute shader programs executed on parallel processing hardware are disclosed. An application or other entity defines a sequence of shader programs to execute. Each shader program defines inputs and outputs which would, if unmodified, execute as loads and stores to a general purpose memory, incurring high latency. A compiler combines the shader programs into groups that can operate in a lower-latency, but lower-capacity local data store memory. The boundaries of these combined shader programs are defined by several aspects including where memory barrier operations are to execute, whether combinations of shader programs can execute using only the local data store and not the global memory (except for initial reads and writes) and other aspects.

20 Claims, 5 Drawing Sheets

(56) References Cited

OTHER PUBLICATIONS

Mullapudi, R. et al., "Automatically Scheduling Halide Image Processing Pipelines", Proceedings of ACM SIGGRAPH 2016, ACM Transactions on Graphics, Jul. 2016, 11 pgs., vol. 35, Issue 4, Article No. 83, ACM, New York, NY, USA.

Ragan-Kelley, J., "Decoupling Algorithms from the Organization of Computation for High Performance Image Processing", Thesis: Ph. D., Massachusetts Institute of Technology, Department of Electrical Engineering and Computer Science, May 2014, 195 pgs., USA.

Ragan-Kelley, J. et al., "Halide: A Language and Compiler for Optimizing Parallelism, Locality, and Recomputation in Image Processing Pipelines", Proceedings of the 34th ACM SIGPLAN Conference on Programming Language Design and Implementation, Jun. 16-19, 2013, pgs. 519-530, ACM, Seattle, WA, USA.

Ragan-Kelley, J. et al., "Decoupling Algorithms from Schedules for Easy Optimization of Image Processing Pipelines", ACM Transactions on Graphics—Proceedings of ACM SIGGRAPH 2012, Jul. 2012, 12 pgs., vol. 31, Issue 4, Article No. 32, ACM, New York, NY, USA.

\* cited by examiner

FUSED SHADER PROGRAMS

TECHNICAL FIELD

The disclosed embodiments are generally directed to parallel computer processing, and in particular, to fusing shader programs.

BACKGROUND

Some computing frameworks allow for processing pipelines to be defined as a sequence of pre-defined tasks. One example is computer image processing, in which various filters can be applied to an image in sequence to produce a desired result. Techniques for improving execution performance of such processing pipelines are constantly being developed and improved.

BRIEF DESCRIPTION OF THE DRAWINGS

A more detailed understanding may be had from the following description, given by way of example in conjunction with the accompanying drawings wherein.

DETAILED DESCRIPTION

Improvements in compute shader programs executed on parallel processing hardware are disclosed. An application or other entity defines a sequence of shader programs to execute. Each shader program defines inputs and outputs which would, if unmodified, execute as loads and stores to a general purpose memory, incurring high latency. A compiler combines the shader programs into groups that can operate in a lower-latency, but lower-capacity local data store memory. The boundaries of these combined shader programs are defined by several aspects including where memory barrier operations are to execute, whether combinations of shader programs can execute using only the local data store and not the global memory (except for initial reads and writes) and other aspects.

Figure 1:
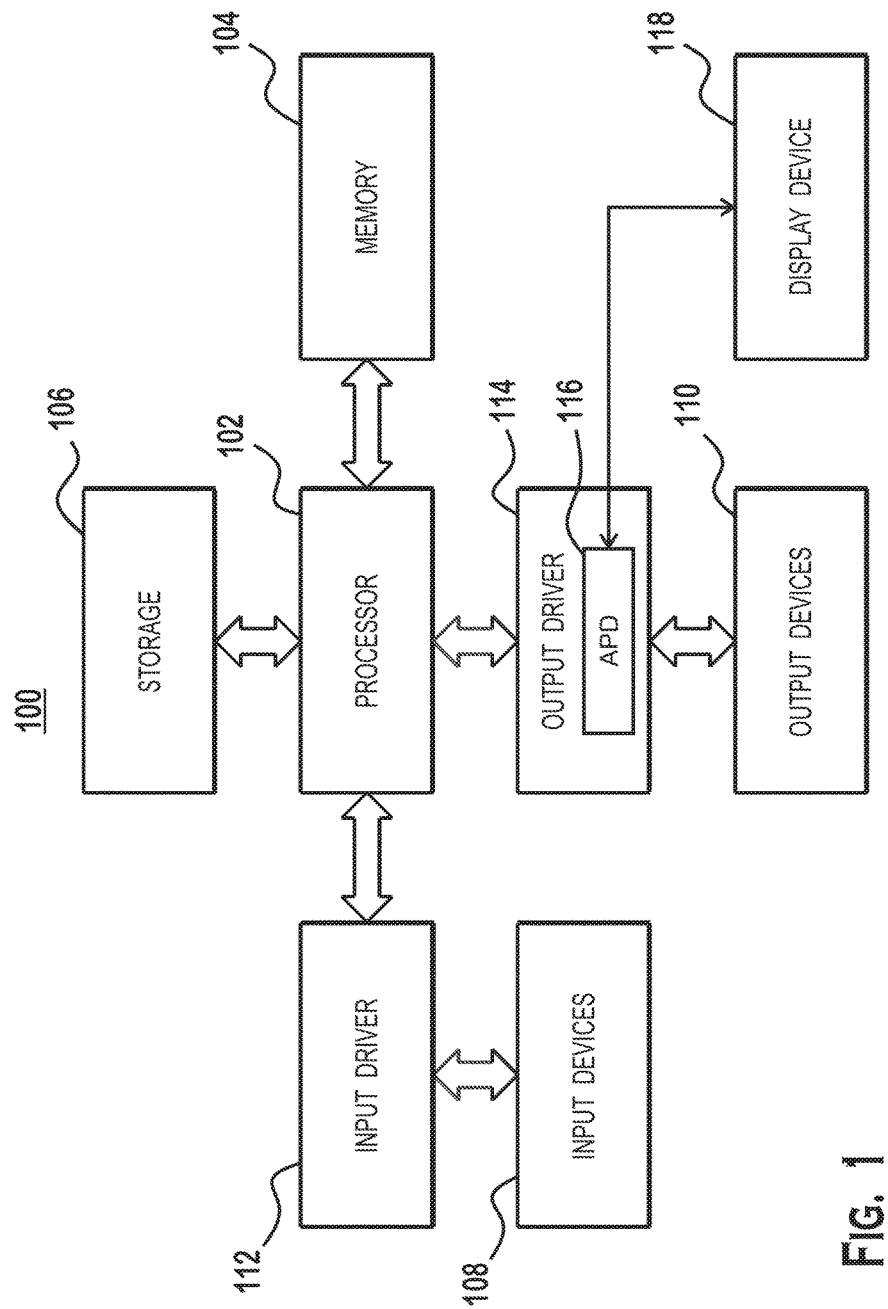
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display. The APD 116 includes one or more or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2A:
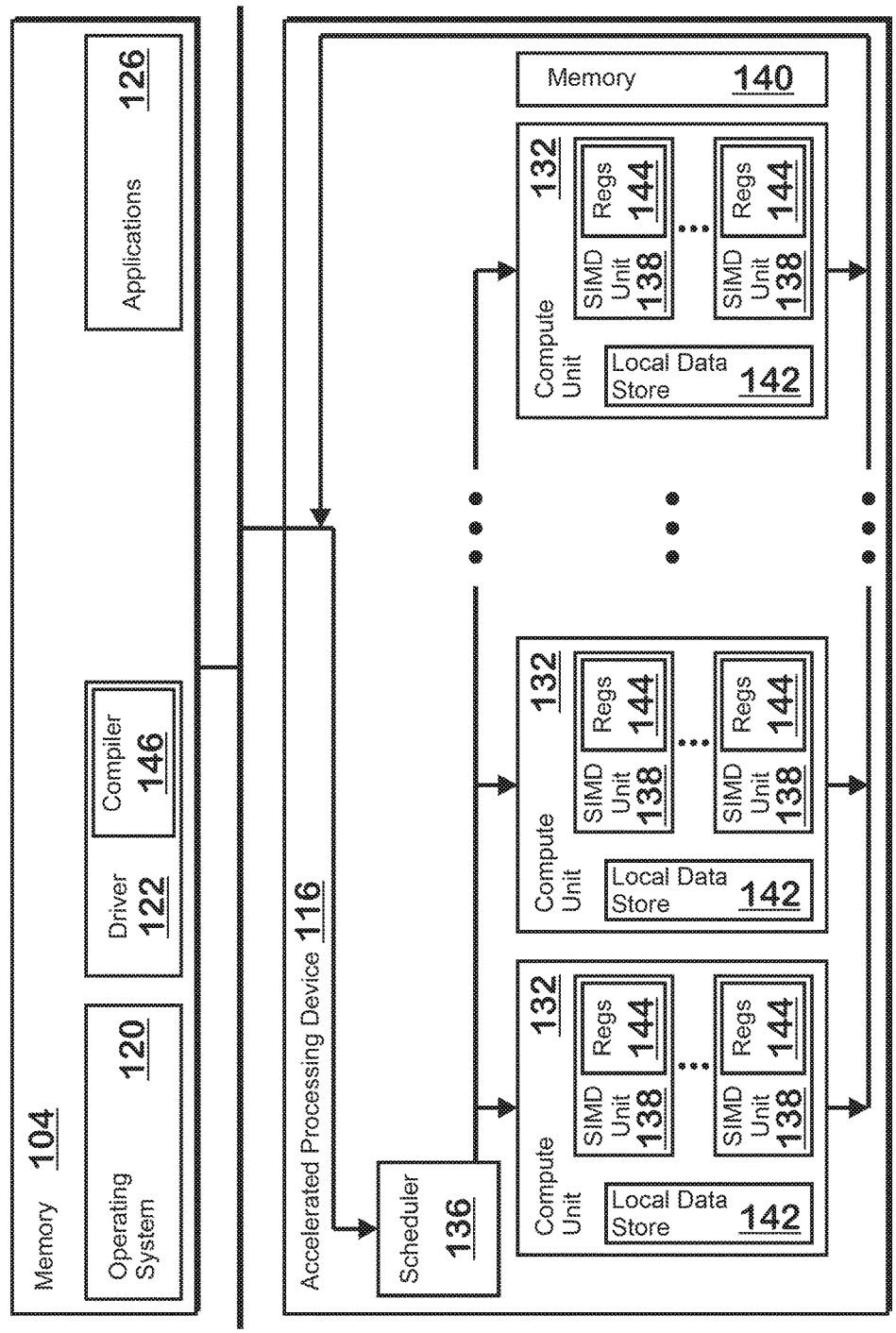
FIG. 2A is a block diagram of the device, illustrating additional details related to execution of processing tasks on an accelerated processing device, according to an example.

FIG. 2A is a block diagram of the device 100, illustrating additional details related to execution of processing tasks on the APD 116, according to an example. The APD 116 includes a scheduler 136, one or more compute units 132, and a memory 140. The compute units 132 include a local data store 142 and one or more single instruction multiple data (SIMD) units 138, each of which is assigned a set of registers 144.

The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler 146 that compiles shader code provided by, e.g., an application 126, into shader programs for execution by processing components (such as the SIMD units 138 discussed in further detail below) of the APD 116.

The APD 116 executes commands and programs for selected functions, such as graphics operations and non-graphics operations, which may be suited for parallel processing. More specifically, the APD 116 executes compute processing operations that are suited to the massively parallel processing nature of the SIMD units 138, such as operations related to video, physics simulation, computational fluid dynamics, or other tasks, based on commands and shader code received from the processor 102. The compiler 146 compiles this shader code into shader programs. The scheduler 136 schedules the shader programs for execution on the various SIMD units 138 of the various compute units 132.

The compute units 132 include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed. Those of skill in the art will understand that although a particular number of lanes is described as being included in the SIMD units 138, SIMD units 138 with different numbers of lanes are contemplated by the present disclosure.

The basic unit of execution in compute units 132 is a work-item. Each work-item represents a single instantiation of a shader program that is to be executed in parallel in a particular lane. Work-items are typically executed simultaneously as a "wavefront" on a single SIMD unit 138. Multiple wavefronts are included in a "work group," which includes a collection of work-items designated to execute the same program. A work group is executed by executing each of the wavefronts that make up the work group. The wavefronts may be executed sequentially on a single SIMD unit 138 in a compute unit 132 and/or in parallel on different SIMD units 138 in a compute unit 132. Wavefronts in a work group execute together in a single compute unit 132. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). The scheduler 136 is configured to perform operations related to scheduling various wavefronts on different compute units 132 and SIMD units 138, as well as performing other operations for orchestrating various tasks on the APD 116.

The compute units 132 execute shader programs in a synchronized manner such that instances of a shader program (e.g., work-items) "see" up-to-date data from different instances of the shader program within the same compute unit 132. The term "synchronized" does not necessarily mean that all instances of a shader program execute simultaneously, and indeed, instances often do not execute simultaneously within a compute unit 132. Instances of a shader program executed on different compute units 132 are not guaranteed to be synchronized with each other without the use of specific features such as memory barriers or other mechanisms.

The parallelism afforded by the compute units 132 is suitable for graphics related operations such as pixel value calculations, vertex transformations, tessellation, geometry shading operations, and other graphics operations. The compute units 132 are also used to perform computation tasks not related to graphics processing or not performed as part of the "normal" operation of a graphics processing pipeline. An application 126 or other software executing on the processor 102 transmits programs (often referred to as "compute shader programs," which may be compiled by the driver 122) that define such computation tasks to the APD 116 for execution.

In many situations, an application 126 requests that a series of shader programs is executed to process large amounts of data. Each shader program defines inputs and outputs that are processed as memory access operations (e.g., reads and writes). Such memory access operations are associated with a relatively large amount of latency if the memory access operations access a general purpose memory such as the memory 140 that is commonly accessible to all compute units 132 in the APD 116. Thus, executing a large number of shader programs sequentially is associated with a large amount of latency due to memory accesses.

To avoid this latency, the compiler 146 is configured to combine multiple shader programs in a manner that reduces the number of accesses to high latency memories. More specifically, the compiler 146 is configured to accept multiple shader programs from an application 126, and include operations from two or more of the shader programs into a single combined shader program. This combining operation reduces memory access latency because accesses to data that would require accesses to a global memory such as memory 140 if the shader programs were kept separate are converted to accesses to more local memories such as the local data store 142 or the registers 144, which have better memory access characteristics (e.g., latency—the registers 144 have better latency characteristics than memory 140 and local data store 142 and the local data store 142 has better latency characteristics than the memory 140). Details related to these various memories in the context of the SIMD execution paradigm are now provided.

Figure 2B:
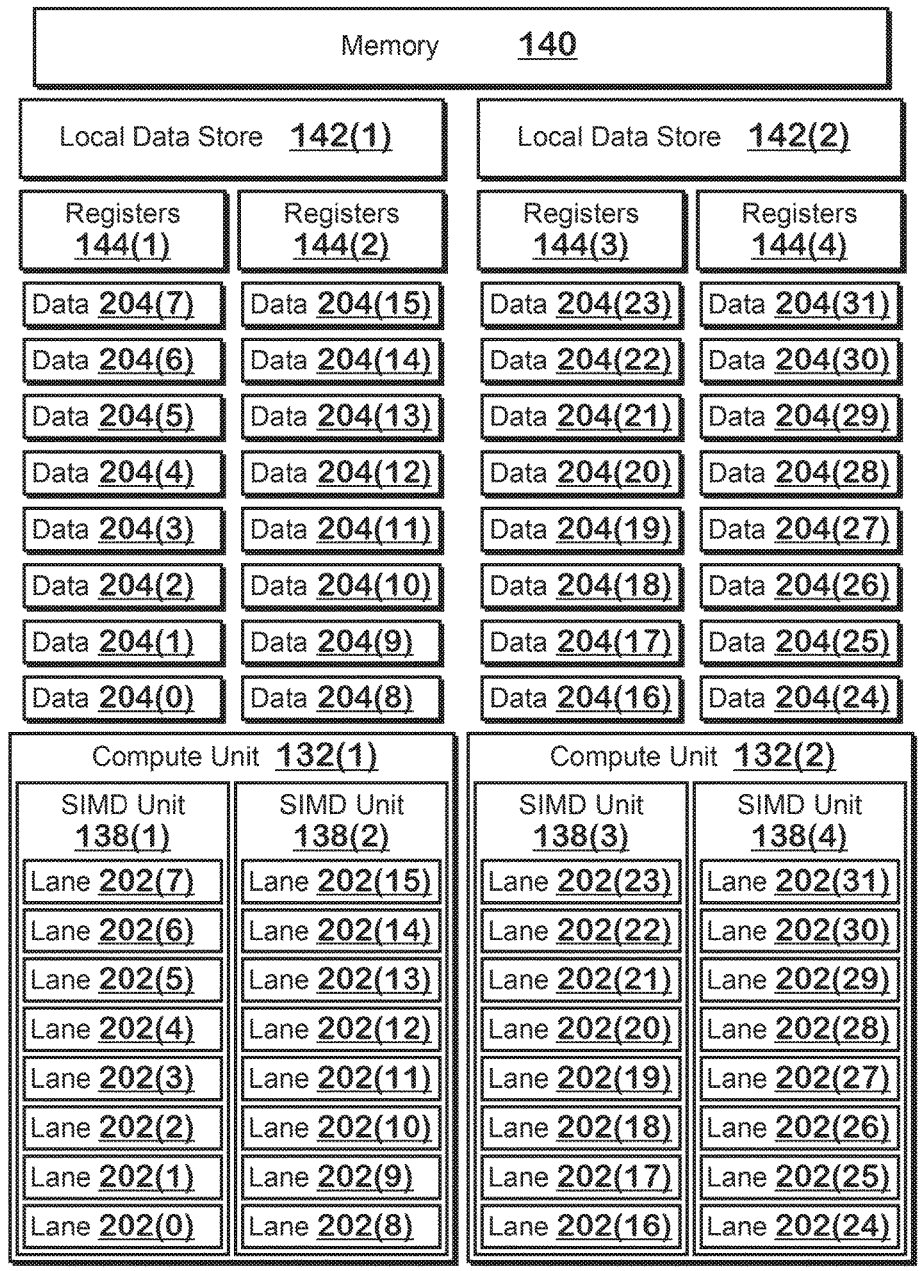
FIG. 2B illustrates additional details of the compute units and associated memories, according to an example.

FIG. 2B illustrates additional details of the compute units 132 and associated memories, according to an example. As described above, each SIMD unit 138 includes a number of lanes 202 that execute the same instruction simultaneously but on different data. Data items 204 are illustrated, with different data items 204 corresponding to different lanes 202 in the SIMD units 138. Each data items 204 has a parenthetical reference number (such as (0) or (1), for example), that indicates the lane 202 that corresponds to that data item 204. Specifically, a lane 202 corresponds to a data item 204 if the lane 202 and the data item 204 have the same parenthetical reference number. The fact that a data item 204 corresponds to a lane 202 means that the data item 204 is the piece of data that is being modified by that lane 202. More specifically, each lane 202 is assigned to process a certain set of data, where "process" means modify that item of data according to the shader program being executed in that lane 202.

Even though each lane 202 is assigned to modify one data item 204, that lane 202 has the ability to read data items 204 assigned to other lanes 202 (although again, each lane 202 modifies the data item 204 assigned to that lane 202 and does not modify data items 204 assigned to other lanes 202). The manner in which lanes 202 read data assigned to other lanes is dependent upon which SIMD unit 138 and compute unit 132 the lanes 202 are in. If both the lane 202 that reads data from another lane 202 and the lane 202 that writes the data to be read are in the same SIMD unit 138, then the data is capable of being communicated via registers 144. More specifically, the lane 202 writing the data writes that data to a register 144 and the lane 202 reading the data reads that data from the register 144. Because the two lanes 202 are in the same SIMD unit 138, the two lanes 202 are both able to access the registers 144.

Registers 144 of one SIMD unit 138 are not accessible to lanes 202 in a different SIMD unit 138. Thus, if a lane 202 is to read data written by a lane 202 that is not in the same SIMD unit 138, then the writing lane writes the data to a memory other than the registers 144. If the two lanes 202 are in the same compute unit 132, then the writing lane 202 is able to use the local data store 142 to communicate the data. In such a scenario, the writing lane 202 writes the data to the local data store 142 and the reading lane 202 reads the data from that data store. If the two lanes 202 are not in the same compute unit 132, then the writing lane 202 is not able to use the local data store 142 to communicate the data because a lane 202 in one compute unit 132 is not able to read data in a local data store 142 of a different compute unit 132. In this scenario, the writing lane 202 writes the data to a global memory 140 and the reading lane 202 reads the data from that global memory 140. The global memory 140 is accessible to all compute units 132 in the APD 116. Alternatively, the writing lane 202 writes the data into any other memory location that is accessible to both lanes 202, such as system memory 104 or a different memory.

Figure 3:
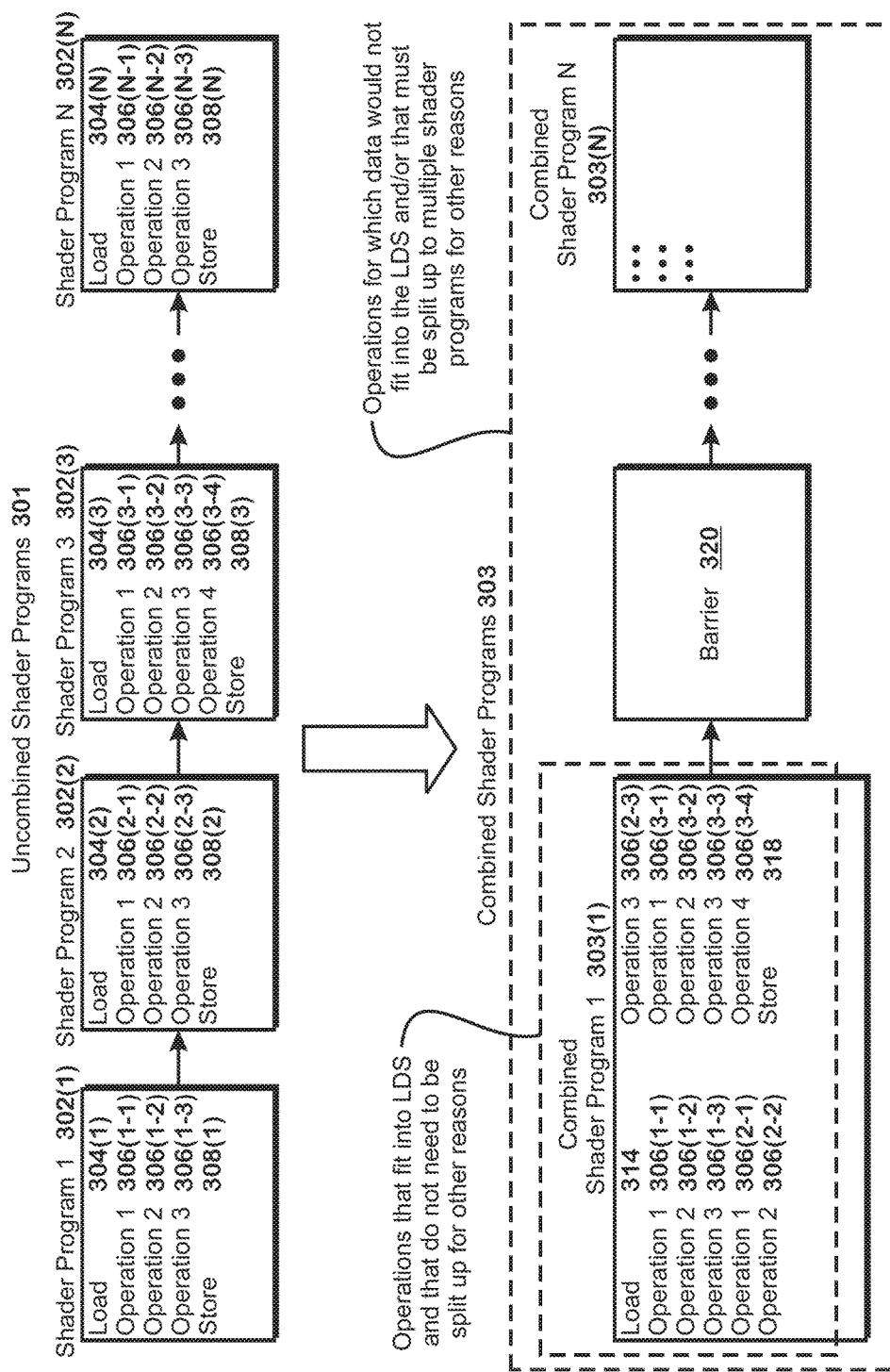
FIG. 3 illustrates a technique for combining the shader programs, according to an example.

The compiler 146 combines shader programs to reduce memory access latency by accounting for the differing memory access characteristics of the various memories in the APD 116—namely, the registers 144, local data store 142, and global memory 140. FIG. 3 illustrates a technique for combining the shader programs, according to an example.

The compiler 146 receives uncombined shader programs 301 from an entity such as an application 126 and combines the uncombined shader programs 301 to generate the combined shader programs 303. Uncombined shader programs 301 include shader programs 302 substantially as specified by the application 126 (which may be compiled by the compiler 146). More specifically, the application 126 specifies the shader programs 302 to process a set of data. Each shader program 302 specifies one or more inputs and one or more outputs. The inputs are reflected in and implemented as loads 304 and the outputs are reflected in and implemented as stores 308. The shader programs 302 thus load data, perform one or more operations 306, and then store the data. As described above, these loads 304 and stores 308 are generally loads and stores to the general memory 140, which incurs large amounts of latency.

The compiler 146 converts the uncombined shader programs 301 to the combined shader programs 303. The combined shader programs 303 include operations 306 from multiple shader programs 302 but include a reduced number of the loads 304 and stores 308 that access the general purpose memory 140.

Except for the initial load 314 and store 318 for a combined shader program 303, the operations included in a combined shader program 303 load from and store to local data store 142 and/or access the registers 144. The determination of whether a particular set of operations 306 is to use the local data store 142 may be accomplished using traditional compiler techniques such as analysis to determine whether data is to be spilled over from registers to the local data store 142. Briefly, such analysis involves analyzing the operations 306 to identify the amount of "live" (in-use) data and determining whether that amount of data is greater than the number of registers available for use. For data that is spilled over into the local data store 142 from registers, the compiler 146 inserts appropriate loads and stores to the local data store 142. Similar analysis is performed to determine whether data for the operations 306 can fit into the local data store 142. Operations 306 for which data does not fit into the local data store 142 are not included together in a combined shader program 303 and are instead included in multiple combined shader programs 303 because such operations cannot execute together in a single compute unit 132.

The point in the uncombined shader programs 302 at which a combined shader program 303 "begins" and "ends" (i.e., the delineation of operations 306 included in the combined shader program 303) is defined based on the number of operations 306 that can be grouped together such that all working data for those operations 306 fits in the local data store 142 (as opposed to needing to be read from and/or written to the global memory 140). The beginning and end of combined shader programs 303 are also defined by whether a memory barrier operation 320 is to be used. A memory barrier is an operation that causes operations after the barrier to wait to execute until memory operations before the barrier have completed. In the case of the combined shader programs 303 illustrated in FIG. 3, the barrier 320 would cause the combined shader program 303 after the barrier 320 to wait to execute until memory operations for the combined shader program 303 have completed. If a barrier operation 320 is to be used, then the point at which the barrier operation 320 is inserted defines the boundary between one combined shader program 303 and another combined shader program 303.

There are several situations in which a barrier operation 320 is to be used. A barrier operation 320 is to be used in the situation that a particular shader program 302 explicitly requires a barrier operation before or after that shader program 302 executes. More specifically, each shader program 302 may specify that a barrier operation 320 is required before and/or after that shader program 302. A barrier operation 320 is also to be used if operations 306 of a particular shader program 302 that execute on a particular compute unit 132 are dependent on operations that execute on a different compute unit 132. Such a situation arises if there is a continuous dependency across a set of data. In one example, an image is processed by a sequence of shader programs 302. In one of the shader programs 302, an operation exists that modifies a pixel but is dependent on the values of surrounding pixels. Because of this dependency, there will be some data in a compute unit 132 that is dependent on data outside of that compute unit 132. In that situation, a barrier operation 320 is inserted before the combined shader program 303 that includes the operations of the shader program 302 with the continuous dependency.

A barrier operation 320 is not necessarily needed if dependencies are not "continuous." For example, if data is processed in tiles, such as 3×3 groups of pixels, where modifications for each data item in the tile is dependent only on the other data items in the tile, then a barrier operation 320 is not needed, since operations 306 in one compute unit 132 does not rely on data from another compute unit 132. Incidentally, the non-continuous dependency presents an opportunity for refactoring by the compiler 146. More specifically, in some situations, the uncombined shader program 302 is written such that each work-item processes a single group of data tiles without continuous dependencies. In such instances, the compiler 146 modifies the operations 306 from that uncombined shader program 302 such that each work-item modifies more than one data item in the group of tiles. In some examples, the compiler 146 modifies such operations 306 such that each work-item modifies all data items in a particular tile. This modification provides benefits such as maintaining memory locality of data processed together (e.g., in registers 144 for a single SIMD unit 138).

For combined shader programs 303 modified by the compiler 146 such that work-items modify more data items than specified in the shader program 302 from which the operations 306 of the combined shader programs 303 are derived, the compiler 146 inserts and/or modifies the load 304 and store operations 308 to read from and write to the more data items, rather than the original number of data items specified in the shader program 302 from which the operations 306 were derived. In one example, the compiler 146 modifies operations from a shader program 302 for which a work-item works on one data item such that a work-item modifies a 3×3 set of data items. In this instance, the compiler 146 modifies and/or inserts a load operation to load data upon which the 3×3 set of data items depends and also modifies and/or inserts a store operation to store the 3×3 set of data, instead of just one data item.

A barrier operation 320 is also to be used if the dependencies of a particular shader program 302 indicate that operations in that shader program 302 are dependent on more data than can fit in a particular local data store 142. In such a situation, because multiple compute units 132 are used to generate that data, a barrier operation 320 is inserted before the combined shader program 303 that has the dependency on more data than can fit in a local data store 142. In one example related to image processing, a shader program 302 includes operations 306 that rely on a histogram for an image. A histogram is dependent on substantially all pixel values in an image, and such substantially all pixel values would in some circumstances not all be processed by a single compute unit 132. In that situation, the shader program 302 would indicate that a barrier operation 320 would be required before the operations 306 of that shader program 302 when that shader program 302 is combined into a combined shader program 303.

In addition to performing memory related functions (e.g., causing operations 306 after the barrier operation 320 to wait for memory operations before the barrier operation 320 to complete before beginning), a barrier operation 320 also marks the boundary between combined shader programs 303. In other words, the compiler 146 does not include a barrier operation 320 within combined shader programs 303, but instead uses the barrier operation 320 to separate different combined shader programs 303.

Each barrier operation 320 that is inserted may be one of at least two different types. A first type is orchestrated by the APD 116 without direct intervention by the processor 102. With the first type, the APD 116 waits for all compute units 132 executing a particular sequence of combined shader programs 303 to arrive at the barrier point (i.e., to finish executing the combined shader program 303 prior to the barrier 320) and waits for all memory operations for those combined shader programs 303 to complete. Once complete, the APD 116 launches the combined shader programs 303 subsequent to the barrier operation 320 for execution. This type of barrier operation 320 is used before a combined shader program 303 that is dependent on more data than would fit in a local data store 142.

A second type of barrier operation is orchestrated by the processor 102 and does not require all compute units to arrive at the barrier before proceeding. Instead, the processor 102 orchestrates launching instances of the combined shader program 303 after the barrier operation 320 based on signals indicating that particular sets of data are ready from the combine shader program 303 before the barrier operation 320. More specifically, the processor 102 launches combined shader programs 303 after the barrier operation 320 after determining that the data upon which the combined shader program 303 after the barrier operation 320 depends is available. One situation in which this type of barrier operation 320 is used is when a combined shader program 303 after the barrier operation 320 has continuous dependencies but is not dependent on substantially the entire set of data (e.g., the entire image).

In one example, a sequence of combined shader programs 303 includes image processing operations. Instances of a particular combined shader program 303 are executing in different compute units 132 prior to a barrier instruction 320. The different compute units 132 produce data for different parts of the image. The combined shader program 303 after the barrier instruction 320 is dependent on data produced by multiple compute units 132 but not by substantially all of the compute units 132. Thus each instance of the combined shader program 303 after the barrier operation 320 only needs to wait for completion of the combined shader program 303 before the barrier operation 320 in a limited number of compute units 132. To facilitate this operation, the combined shader program 303 before the barrier operation 320 notifies the processor 102 when complete on a particular compute unit 132. In response to data being available for an instance of the combined shader program 303 after the barrier operation 320, the processor 102 launches that instance of that combined shader program 303 for execution.

Figure 4:
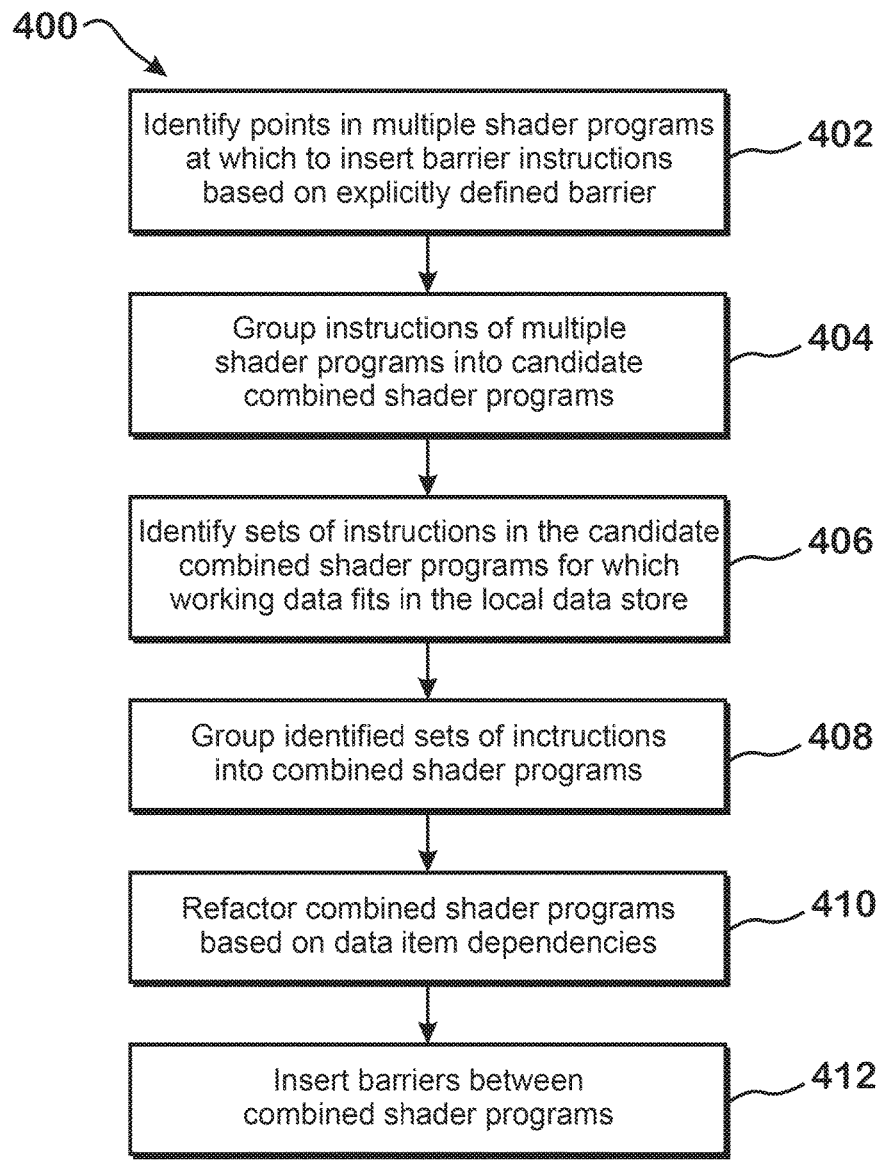
FIG. 4 is a flow diagram of a method 400 for combining shader programs to form combined shader programs, according to an example.

FIG. 4 is a flow diagram of a method 400 for combining shader programs to form combined shader programs, according to an example. Although described with respect to the system shown and described with respect to FIGS. 1-3, it should be understood that any system configured to perform the method, in any technically feasible order, falls within the scope of the present disclosure.

The method 400 begins at step 402, where the compiler identifies points in shader programs at which to insert barrier operations 320 (also called barrier instructions) based on explicitly defined barrier points. More specifically, as described above, some of the shader programs 302 explicitly indicate a requirement for a barrier instruction, either after or before the operations 306 of the shader programs 302. The compiler 146 notes these points as points to insert barrier operations 306 between combined shader programs 303.

At step 404, the compiler 146 groups operations 306 (also called "instructions") into candidate combined shader programs. These candidate combined shader programs are groups of operations between the identified points for barrier operations. It is possible that the operations in the candidate combined shader programs require more memory than is included in a local data store 142. Therefore, at step 406, the compiler 146 identifies sets of instructions, within the candidate combined shader programs, for which data would fit into the local data store 142. At step 408, the compiler 146 groups the identified sets of instructions into the combined shader programs 303.

At step 410, the compiler 146 refactors the combined shader programs 303 based on data item dependencies defined for operations 306. Refactoring includes performing analysis to determine where to convert loads and stores to the global memory 140 into loads and stores to the local data store 142 or to registers 144. As described above, this analysis is based on standard compiler techniques such as techniques for determining whether a particular set of working data can fit into registers 144 or must "spill over" into the local data store 142.

In one example, refactoring includes modifying operations 306 such that the operations 306 work on more data items than defined in the shader program 302 from which the operations 306 originate. In one example, a shader program 302 includes operations that work on individual pixels. With combined shader programs 303, it is possible for data for multiple pixels to be loaded into registers 144 or the local data store 142. For such combined shader programs 303, the compiler 146 refactors operations 306 derived from the shader program 302 to work on multiple pixels rather than a single pixel. More specifically, the compiler 146 modifies the operations 306 so that a single work-item executing the modified operations 306 works on more data items than a single work-item executing non-modified versions of the operations 306. In such situations, refactoring also includes modifying the operations 306 of the combined shader program 303 to include loads and stores of the larger-sized set of data.

At step 412, the compiler 146 inserts the barrier operations 320 at locations specified explicitly by the shader programs 302 and at locations specified based on the data dependencies of the operations. More specifically, as described above, the compiler 146 inserts barrier operations 320 based on the explicit indication by shader programs 302 (i.e., before or after operations 306 for which barrier operations 320 are explicitly identified by shader programs 302) and before combined shader programs 303 that read data generated by more than one compute unit 132. Hardware-based barrier operations 320 are used before a combined shader program 303 that is dependent on substantially an entire set of data and processor 102-based barrier operations 320 (e.g., those where the barrier is moderated by the processor 102 to allow combined shader programs 303 to launch when data is available) are used where the combined shader program 303 is based on data generated by other compute units 132 but not based on substantially the entire set of data.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for modifying shader programs to improve memory access characteristics, the method comprising:
   identifying a first set of operations from a first set of two or more uncombined shader programs, wherein working data for the first set of operations fits into a local data store;
   editing together the first set of uncombined shader programs by forming a first combined shader program that includes the first set of operations, the first combined shader program excluding a second set of operations of the first set of uncombined shader programs, wherein the second set of operations has working data that, combined with the working data for the first set of operations, does not fit into the local data store;
   modifying store operations of the first set of operations to a global memory of the first combined shader program into store operations to the local data store or to registers; and
   modifying load operations of the first set of operations from a global memory of the first combined shader program into a load operation to the local data store or to registers.

2. The method of claim 1, further comprising:
   identifying a second set of operations from a second set of two or more uncombined shader programs for which working data fits into a local data store;
   forming a second combined shader program from the second set of operations;
   modifying a second store operation to a global memory of the second combined shader program into a store operation to a local data store; and
   modifying a second load operation from a global memory of the first combined shader program into a load operation to the local data store.

3. The method of claim 2, further comprising:
   inserting a barrier operation between the first combined shader program and the second combined shader program.

4. The method of claim 3, wherein inserting the barrier operation comprises:
   determining that one of the second set of two or more uncombined shader programs specifically indicates that the barrier operation is to be included; and
   responsive to the determining, inserting the barrier operation.

5. The method of claim 3, wherein inserting the barrier operation comprises:
   determining that the second combined shader program is dependent on substantially an entire data set processed by a plurality of compute units on which the first combined shader program and the second combined shader program execute; and
   responsive to the determining, inserting the barrier operation, wherein the barrier operation causes the plurality of compute units to wait until all of the plurality of compute units reach the barrier operation before proceeding to the second combined shader program.

6. The method of claim 3, wherein inserting the barrier operation comprises:
    determining that the second combined shader program has a dependency in which a compute unit executing the second combined shader program is dependent on data generated by two or more compute units but not on substantially the entire data set processed by a plurality of compute units on which the first combined shader program and the second combined shader program execute; and
    responsive to the determining, inserting the barrier operation, wherein the barrier operation causes instances of the second combined shader program to wait for memory accesses to complete for instances of the first combined shader program on which the instances of the second combined shader program depend.

7. The method of claim 2, wherein:
    data for the first set of two or more operations and the second set of two or more operations would not fit in a local data store if included in a single combined shader program and executed; and
    the method further comprises identifying the first set of operations for the first combined shader program and the second set of operations for the second combined shader program by determining a boundary between the first set of operations and the second set of operations that allows working data for both the first set of operations and the second set of operations to be stored in a local data store when executed as combined shader programs.

8. The method of claim 1, further comprising:
    modifying at least one operation of the first combined shader program such that an instance of the first combined shader program modifies more data items than an instance of any of the first set of two or more uncombined shader programs.

9. The method of claim 8, further comprising:
    modifying a load operation of the first combined shader program to load data for the more data items than an instance of any of the first set of two or more uncombined shader programs.

10. A computing device for modifying shader programs to improve memory access characteristics, the computing device comprising:
    an accelerated processing device comprising:
        a plurality of compute units configured to execute compute shader programs,
        a global memory accessible by the plurality of compute units, and
        a plurality of local data stores, each accessible to a different compute unit; and
    a compiler configured to:
        identify a first set of operations from a first set of two or more uncombined shader programs, wherein working data for the first set of operations fits into a local data store of the plurality of local data stores;
        editing together the first set of uncombined shader programs by forming a first combined shader program that includes the first set of operations, the first combined shader program excluding a second set of operations of the first set of uncombined shader programs, wherein the second set of operations has working data that, combined with the working data for the first set of operations, does not fit into the local data store;
        modifying all store operations of the first set of operations to the global memory of the first combined shader program into store operations to a local data store of the plurality of local data stores or to registers; and
        modifying all load operations of the first set of operations from the global memory of the first combined shader program into a load operation to the local data store or to registers.

11. The computing device of claim 10, wherein the compiler is further configured to:
    identify a second set of operations from a second set of two or more uncombined shader programs for which working data fits into a local data store;
    form a second combined shader program from the second set of operations;
    modify a second store operation to the global memory of the second combined shader program into a store operation to a local data store of the plurality of local data stores; and
    modify a second load operation from the global memory of the first combined shader program into a load operation to the local data store.

12. The computing device of claim 11, wherein the compiler is further configured to:
    insert a barrier operation between the first combined shader program and the second combined shader program.

13. The computing device of claim 12, wherein inserting the barrier operation comprises:
    determining that one of the second set of two or more uncombined shader programs specifically indicates that the barrier operation is to be included; and
    responsive to the determining, inserting the barrier operation.

14. The computing device of claim 12, wherein inserting the barrier operation comprises:
    determining that the second combined shader program is dependent on substantially an entire data set processed by a plurality of compute units on which the first combined shader program and the second combined shader program execute; and
    responsive to the determining, inserting the barrier operation, wherein the barrier operation causes the plurality of compute units to wait until all of the plurality of compute units reach the barrier operation before proceeding to the second combined shader program.

15. The computing device of claim 12, wherein inserting the barrier operation comprises:
    determining that the second combined shader program has a dependency in which a compute unit executing the second combined shader program is dependent on data generated by two or more compute units but not on substantially the entire data set processed by a plurality of compute units on which the first combined shader program and the second combined shader program execute; and
    responsive to the determining, inserting the barrier operation, wherein the barrier operation causes instances of the second combined shader program to wait for memory accesses to complete for instances of the first combined shader program on which the instances of the second combined shader program depend.

16. The computing device of claim 11, wherein:
    data for the first set of two or more operations and the second set of two or more operations would not fit in a local data store if included in a single combined shader program and executed; and the compiler is further configured to identify the first set of operations for the first combined shader program and the second set of operations for the second combined shader program by determining a boundary between the first set of operations and the second set of operations that allows working data for both the first set of operations and the second set of operations to be stored in a local data store when executed as combined shader programs.

17. The computing device of claim 10, wherein the compiler is further configured to:

modify at least one operation of the first combined shader program such that an instance of the first combined shader program modifies more data items than an instance of any of the first set of two or more uncombined shader programs.

18. The computing device of claim 17, wherein the compiler is further configured to:

modify a load operation of the first combined shader program to load data for the more data items than an instance of any of the first set of two or more uncombined shader programs.

19. A non-transitory computer-readable medium storing instructions that, when executed by a processor, cause the processor to:

identify a first set of operations from a first set of two or more uncombined shader programs, wherein working data for the first set of operations fits into a local data store;

edit together the first set of uncombined shader programs by forming a first combined shader program that includes the first set of operations, the first combined shader program excluding a second set of operations of the first set of uncombined shader programs, wherein the second set of operations has working data that, combined with the working data for the first set of operations, does not fit into the local data store;

modify all store operations of the first set of operations to a global memory of the first combined shader program into store operations to the local data store or to registers; and modify all load operations of the first set of operations from a global memory of the first combined shader program into a load operation to the local data store or to registers.

20. The non-transitory computer-readable medium of claim 19, wherein the instructions further cause the processor to:

identify a second set of operations from a second set of two or more uncombined shader programs for which working data fits into a local data store;

form a second combined shader program from the second set of operations;

modify a second store operation to a global memory of the second combined shader program into a store operation to a local data store;

modify a second load operation from a global memory of the first combined shader program into a load operation to the local data store; and insert a barrier operation between the first combined shader program and the second combined shader program.

* * * * *